“3,487,454
POLY(ARYLENE SULFIDE) RESINS
Alex N. Oates and James T. Edmonds, Jr., Bartlesville, Okla., assignors to Phillips Petroleum Company, a corporation of Delaware
No Drawing. Filed Mar. 20, 1968, Ser. No. 714,427
Int. Cl. C08g 43/02
U.S. 260—900                        6 Claims

ABSTRACT OF THE DISCLOSURE

Improving the processing characteristics such as moldability and extrudability of poly(arylene sulfide) resins by incorporating therein a small amount of a polyfluorocarbon polymer.

BACKGROUND OF THE INVENTION

This invention relates to the improvement of the processing characteristics of poly(arylene sulfide) resins. In accordance with a further aspect, this invention relates to the addition of a polyfluorocarbon polymer to poly(arylene sulfide) resins to improve their molding and extruding characteristics.

Poly(arylene sulfide) resins are known in the art but their utility has been somewhat limited in that many of these poly(arylene sulfide) resins have a very high molecular weight and high melting points and therefore are quite difficult to process. Continued efforts have been directed by the industry to improve the molding and extrudability characteristics of these resins. If the molding and extruding characteristics as well as the other processing characteristics of poly(arylene sulfide) resins could be improved, these resins would be adaptable for fabrication into many different items having utility in many fields.

In accordance with the invention, it has been found that the addition of a small amount of a polyfluorocarbon polymer to poly(arylene sulfide) resins results in a product having improved processing characteristics.

Accordingly, an object of this invention is to improve the processing characteristics of poly(arylene sulfide) resins.

A further object of this invention is to provide poly(arylene sulfide) resins having improved molding and extruding characteristics.

A further object of this invention is to provide an additive compound for poly(arylene sulfide) resins that functions as a release agent.

A still further object of this invention is to improve the processing characteristics of poly(arylene sulfide) resins without altering the other physical properties of the resins.

Other objects and aspects, as well as the several advantages of the invention, will be apparent to those skilled in the art upon reading the specification and the appended claims.

SUMMARY OF THE INVENTION

In accordance with the invention, a small amount of a polyfluorocarbon polymer is incorporated into poly(arylene sulfide) resin are both blended together as particulate istics.

In accordance with one embodiment of the invention the addition of from 0.5 to 10 weight percent of a polyfluorocarbon polymer, such as polytetrafluoroethylene, to a poly(arylene sulfide) resin results in a blend of polymers having improved molding and extruding characteristics.

In accordance with a further embodiment of the invention, the polyfluorocarbon polymer and the poly(arylene sulfide) resin are both blended together as particulate materials.

Advantages obtaining from the blends of the invention include greater ease in extrusion of the poly(arylene sulfide) resin, particularly where very tough, high molecular weight polymers are processed in ram-type extruders. Also, greater ease in filling a mold and the elimination of the need for release agents normally applied to the molds will be realized according to the invention. Furthermore, the addition of the polyfluorocarbon polymer results in a reduction of the surface coefficient of friction and imparts lubricity which thereby eliminates the need for additional lubricants such as molybdenum disulfide and provides ready release of finished parts made from polyphenylene sulfide resins from the molds.

DESCRIPTION OF PREFERRED EMBODIMENTS

The present invention is useful with poly(arylene sulfide) resins generally regardless of the method of preparation. It can be used, for example, with poly(arylene sulfide) resins prepared as described in U.S. Patent 2,513,188 wherein polyhaloaromatic compounds are reacted with sulfur and a metal sulfide at the fusion temperature. It can also be used with resins manufactured by the method described in British Patent 962,941 wherein metal salts of halothiophenols are heated at a polymerizing temperature. The invention is particularly useful with polymers prepared by the solution reaction of polyhalo compounds with alkali metal sulfides as described in Ser. No. 327,143, filed Nov. 27, 1963, now U.S. Patent 3,354,129, Edmonds et al.

According to the said Edmonds et al patent, poly(arylene sulfide) resins, often called poly(phenylene sulfide) resins, can be prepared in high yields by reacting (a) at least one polyhalo-substituted cyclic compound containing unsaturation between adjacent ring atoms wherein the halogen atoms are attached to ring carbon atoms with (b) an alkali metal sulfide in a polar organic diluent at an elevated temperature. Generally, the polar organic diluent will essentially dissolve both of the alkali metal sulfide and the polyhalo-substituted aromatic compound or other compound which can be present. The polymers produced by the process of said Edmonds et al. patent are ordinarily particulate materials and the properties of these materials will vary considerably depending upon the chosen reactants. Some are high-melting thermoplastic materials having extra high temperature stability while others can be much lower in molecular weight, including liquids and grease-like materials. Melting points and softening points of these materials can range all the way from liquids at 25° to polymers softening above 400° C., and the latter materials are ordinarily very difficult to process in conventional molding and extruding equipment.

The polyfluorocarbon polymers added to the poly(arylene sulfide) resins are preferably finely-divided particulate materials having particle sizes of about 1 micron. A presently preferred polyfluorocarbon polymer is polytetrafluoroethylene resin.

The amount of polytetrafluoroethylene added to the poly(arylene sulfide) resins of the invention will range from 0.5 to 10 weight percent, preferably 1 to 3 weight percent.

The poly(arylene sulfide) resin employed in the composition of this invention and especially those obtained according to the process of Edmonds et al. can be employed in the form of a finely-divided powder or fluff as obtained from the polymerization reaction.

The polyfluorocarbon resin can be incorporated into the poly(arylene sulfide) resin in any convenient manner. For example, the polyfluorocarbon resin in the form of finely-divided particles can be added, as such, to at least one finely-divided poly(arylene sulfide) resin and the resulting mixture being agitated in any suitable manner to achieve good mixing.

It is within the scope of the invention to compound the blended resin products of this invention with small amounts of ultraviolet absorbing materials or thermal and oxidative inhibitors which improve their resistance to weathering and use at elevated temperatures. Likewise, finely-divided fillers, such as carbon black, can be added to improve their outdoor durability. Moreover, decorative effects can be achieved by the addition of coloring pigments and dyes.

The products of the invention have utility for extrusion of sheets, wire coverings, the molding of shaped articles, and the like. Other uses include ablative materials in nose cones of spaceships, valve seats, heat resistant metal coatings, insulators, and the like.

SPECIFIC EXAMPLE

A poly(phenylene sulfide) resin was prepared by the reaction of p-dichlorobenzene and 1,2,4-trichlorobenzene with sodium sulfide in N-methylpyrrolidone as the reaction diluent.

One liter of N-methylpyrrolidone was mixed with 720 grams of sodium sulfide in a reactor which was flushed with nitrogen and heated to a temperature of 200° C. to remove water. The above mixture was then charged to a stainless steel reactor and to this was added 407 grams p-dichlorobenzene and 36 grams 1,2,4-trichlorobenzene with 400 mls. of N-methylpyrrolidone. The reactor was sealed and heated for three hours at 475° F.

The reactor was cooled and the contents removed and the polymers recovered by repeated washings with water, acetone, warm benzene and acetone, and then finally dried by vacuum. A poly(phenylene sulfide) resin was recovered from the polymerization as finely-divided material.

720 grams of this polymer was blended with 15 grams of polytetrafluoroethylene. The polytetrafluoroethylene had an average particle size of about one micron. The mixture of the two polymers was placed in a fiber drum and rolled on a roll mill for approximately 16 hours to make a homogeneous blend.

The above polymer blend of poly(phenylene sulfide) resin and polytetrafluoroethylene was then molded to determine whether the blended product could be readily removed from the mold. 600 grams of the above blend was placed in a 6-inch by 6-inch cavity mold and a pre-mold was made at 30,000 p.s.i.g. and at a mold temperature of 350 to 500° F. The pre-mold was removed from the cavity mold and the cavity mold was then heated to 700° F. The premold slab was heated to 500° F. The preheated, premolded slab was then placed in the mold and pressed at 650–700° F. for 30 minutes at 30,000 p.s.i.g. The molded particles were allowed to cool slowly and the slab was annealed for 3 hours at 400° F. The slab was very easy to remove from the mold due to the presence of the polytetrafluoroethylene.

A similar slab made from poly(phenylene sulfide) polymer prepared as in the example but without admixture of polytetrafluoroethylene could not be removed readily and had to be separated from the mold by hammer and chisel.

A comparison of the properties of the poly(phenylene sulfide) polymer slabs with and without polytetrafluoroethylene is shown in the table below.

TABLE

| Physical properties | Poly(phenylene sulfide) | Poly(phenylene sulfide)+2% Polytetrafluoroethylene | Test |
|---|---|---|---|
| Flexural modulus, p.s.i. $\times 10^{-3}$ | 392 | 388 | ASTM D-790. |
| Tensile break, p.s.i. | 8,700 | 7,400 | ASTM D-638. |
| Elongation, percent | 4 | 4 | ASTM D-638. |

The physical properties show only insignificant changes while the processability has been greatly improved.

We claim:
1. The composition of matter comprising at least one poly(phenylene sulfide) resin and from 0.5–10 weight percent of a polytetrafluoroethylene.
2. The composition of claim 1 wherein said poly(phenylene sulfide) resin is a poly(p-phenylene sulfide).
3. A composition according to claim 1 wherein the amount of polytetrafluoroethylene present is in the range of 1–3 weight percent.
4. The composition of claim 2 wherein said poly(p-phenylene sulfide) is obtained by reacting p-dichlorobenzene and 1,2,4-trichlorobenzene with sodium sulfide in N-methylpyrrolidone.
5. The method of improving the molding and extruding characteristics as well as other processing characteristics of poly(phenylene sulfide) resins without altering substantially its other physical properties which comprises incorporating therein from 0.5–10 weight percent of a polytetrafluoroethylene.
6. The method of claim 5 wherein said poly(phenylene sulfide) resin and said polytetrafluoroethylene are both finely-divided particulate materials.

References Cited

UNITED STATES PATENTS 3,400,065   9/1968   Barth _____ 204—159.2

MURRAY TILLMAN, Primary Examiner
C. J. SECCURO, Assistant Examiner

U.S. Cl. X.R.
260—79.1